US008840948B2

(12) United States Patent
Yamamoto et al.

(10) Patent No.: US 8,840,948 B2
(45) Date of Patent: Sep. 23, 2014

(54) CONCENTRATED COFFEE COMPOSITION AND METHOD OF PRODUCING SAME

(75) Inventors: Shinji Yamamoto, Narashino (JP); Kiyoshi Kataoka, Mitaka (JP); Yasushi Shioya, Toshima-ku (JP); Yoshikazu Ogura, Ichikawa (JP); Hiroshi Hashimoto, Odawara (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 13/878,087

(22) PCT Filed: Oct. 5, 2011

(86) PCT No.: PCT/JP2011/072975

§ 371 (c)(1), (2), (4) Date: Apr. 5, 2013

(87) PCT Pub. No.: WO2012/046766

PCT Pub. Date: Apr. 12, 2012

(65) Prior Publication Data

US 2013/0216685 A1 Aug. 22, 2013

(30) Foreign Application Priority Data

Oct. 5, 2010 (JP) ................................ 2010-225440

(51) Int. Cl.

| | |
|---|---|
| *A23F 5/24* | (2006.01) |
| *A23F 5/28* | (2006.01) |
| *A23F 5/38* | (2006.01) |
| *A23F 5/36* | (2006.01) |
| *A23F 5/40* | (2006.01) |
| *A23F 5/10* | (2006.01) |
| *A23F 5/26* | (2006.01) |

(52) U.S. Cl.

CPC . *A23F 5/28* (2013.01); *A23F 5/243* (2013.01); *A23F 5/385* (2013.01); *A23F 5/36* (2013.01); *A23F 5/40* (2013.01); *A23F 5/10* (2013.01); *A23F 5/38* (2013.01); *A23F 5/26* (2013.01)

USPC ............ 426/594; 426/534; 426/590; 426/650

(58) Field of Classification Search

USPC ................................. 426/594, 534, 590, 650

See application file for complete search history.

(56) References Cited

U.S. PATENT DOCUMENTS

| | | | | |
|---|---|---|---|---|
| 3,493,388 | A * | 2/1970 | Hair | 426/432 |
| 4,798,730 | A * | 1/1989 | Scoville et al. | 426/432 |
| 5,225,223 | A * | 7/1993 | Vitzthum et al. | 426/386 |
| 5,322,703 | A * | 6/1994 | Jensen et al. | 426/595 |
| 8,178,148 | B2 * | 5/2012 | Fujii et al. | 426/422 |
| 8,263,149 | B2 | 9/2012 | Hayakawa et al. | |
| 8,282,973 | B2 | 10/2012 | Shioya et al. | |
| 8,337,929 | B2 | 12/2012 | Ogura et al. | |
| 2007/0160726 | A1 | 7/2007 | Fujii et al. | |
| 2008/0038421 | A1 * | 2/2008 | Gretsch et al. | 426/321 |
| 2008/0113077 | A1 | 5/2008 | Leloup et al. | |
| 2008/0311245 | A1 | 12/2008 | Silver et al. | |
| 2010/0285182 | A1 | 11/2010 | Shioya et al. | |
| 2010/0330241 | A1 * | 12/2010 | Gretsch et al. | 426/387 |
| 2011/0274816 | A1 * | 11/2011 | Gretsch et al. | 426/594 |

FOREIGN PATENT DOCUMENTS

| | | | | |
|---|---|---|---|---|
| CN | 1813556 | A | | 8/2006 |
| CN | 1909793 | A | | 2/2007 |
| CN | 101111156 | A | | 1/2008 |
| CN | 101267743 | A | | 9/2008 |
| JP | 4 88947 | | | 3/1992 |
| JP | 2003 204755 | | | 7/2003 |
| JP | 2005 40068 | | | 2/2005 |
| JP | 2006014645 | | * | 1/2006 |
| JP | 2006 81451 | | | 3/2006 |
| JP | 2006081451 | | * | 3/2006 |
| JP | 4012560 | | | 11/2007 |
| JP | 4012561 | | | 11/2007 |
| JP | 2008 193933 | | | 8/2008 |
| JP | 2008 535506 | | | 9/2008 |
| JP | 2009 501545 | | | 1/2009 |
| JP | 2009017825 | | * | 1/2009 |
| JP | 2009 153426 | | | 7/2009 |
| JP | 2009 153451 | | | 7/2009 |
| JP | 2009 219488 | | | 10/2009 |
| WO | 2005 072533 | | | 8/2005 |

OTHER PUBLICATIONS

Mechanical English Translation for JP 2006081451 published Mar. 2006.*

Mechanical English Translation for JP 2006014645 published Jan. 2006.*

Moon, J., et al., "Role of Roasting Conditions in the Profile of Volatile Flavor Chemicals Formed from Coffee Beans," Journal of Agricultural and Food Chemistry, vol. 57, No. 13, pp. 5823-5831, (2009).

Kanjahn, D., et al., "Hydroxymethyfurfural and Furfural in Coffee and Related Beverages," Deutsche Lebensmittel-Rundschau, vol. 93, No. 2, pp. 44-46, (Feb. 1997).

International Search Report Issued Dec. 13, 2011 in PCT/JP11/72975 Filed Oct. 5, 2011.

* cited by examiner

*Primary Examiner* — Anthony Weier

(74) *Attorney, Agent, or Firm* — Oblon, Spivak, McClelland, Maier & Neustadt, L.L.P.

(57) ABSTRACT

Provided is a concentrated coffee composition containing chlorogenic acids at a high concentration and having good taste or flavor. The concentrated coffee composition of the present invention contains the following components (A) and (B):

100 to 300 mg/g of chlorogenic acids (A) in dry solids content; and not more than 0.33 mg/g of 5-hydroxymethylfurfural (B) in dry solids content, wherein the dry solids content is 10 to 100 mass %.

20 Claims, No Drawings

CONCENTRATED COFFEE COMPOSITION AND METHOD OF PRODUCING SAME

FIELD OF THE INVENTION

The present invention relates to a concentrated coffee composition.

BACKGROUND OF THE INVENTION

A coffee product contains chlorogenic acids such as a chlorogenic acid, coffeic acid or ferulic acid, which are one of polyphenols, and the chlorogenic acids are known to have excellent physiological activities. Therefore, to allow the physiological activities to sufficiently exhibit, it is effective to ingest chlorogenic acids in larger amounts. Chlorogenic acids are contained in a large amount in green coffee beans; however, an extract from green coffee beans is deficient in taste or flavor of coffee. In contrast, when coffee beans are roasted, taste or flavor are improved but the content of chlorogenic acids decreases.

Then, as a coffee product containing chlorogenic acids at a high concentration while enhancing taste or flavor of coffee, for example, a coffee product obtained by grinding a mixture containing green coffee beans and roasted coffee beans in a predetermined ratio and then extracting it, has been proposed (Patent Document 1).

Furthermore, a packaged coffee beverage or a packaged milk coffee beverage, which is prepared by mixing extracts separately obtained from dark roasted coffee beans and light roasted coffee beans, controlling the ratio of chlorogenic acids to tannin and the ratio of dichlorogenic acids to chlorogenic acids of the extract to be predetermined ratios, adding an auxiliary material to the resultant extract and charging a container with the extract, followed by sterilizing, have been proposed (Patent Documents 2 and 3).

In the meantime, a food or beverage, which contains 5-hydroxymethylfurfural or 5-hydroxymethylfuran-2-carboxylic acid in a predetermined amount or more and which does not impair original taste or flavor, can be ingested in daily life for a long time and can prevent occurrence of causes of lifestyle-related diseases such as hyperlipemia, diabetes, arteriosclerosis, thrombus and pneumonia, thereby keeping peoples healthy has been proposed (Patent Document 4).

CITATION DOCUMENT

Patent Document

[Patent Document 1] JP-A-2008-535506
[Patent Document 2] JP-B-4012560
[Patent Document 3] JP-B-4012561
[Patent Document 4] JP-A-2008-193933

SUMMARY OF THE INVENTION

The present invention is to provide a concentrated coffee composition including the following components (A) and (B):

100 to 300 mg/g of chlorogenic acids (A): in dry solids content; and not more than 0.33 mg/g of 5-hydroxymethylfurfural (B) in dry solids content, wherein the dry solids content is 10 to 100 mass %.

The present invention is also to provide a method for producing a concentrated coffee composition, including concentrating a mixture of roasted coffee beans, which contains first roasted coffee beans having an L value of 14 to 20 and second roasted coffee beans having an L value of 25 to 40, and has an average L value of 21 to 28.5, by multi-stage extraction.

DETAILED DESCRIPTION OF THE INVENTION

A coffee product extracted from roasted coffee beans is appreciated because of rich aromatic taste or flavor of coffee; however the extraction process thereof is inconvenient. Then, a concentrated coffee composition such as instant coffee, which is prepared by concentrating or powderizing a coffee extract solution, and a packaged coffee beverage such as a canned coffee have been developed. Owing to the development, consumers can readily enjoy coffee products.

Furthermore, to obtain a coffee product having good taste or flavor by allowing a large amount of chlorogenic acids to contain therein, a technique of extracting a mixture of green coffee beans and roasted coffee beans, and a technique of separately extracting dark roasted coffee beans and light roasted coffee beans to obtain extract solutions and mixing them have been proposed, as described in the above background of the Invention.

The present inventors found a problem in that a concentrated coffee composition having a chlorogenic acids content enhanced by using green coffee beans has foreign taste like green coffee beans. As a prior art thereof, a packaged coffee beverage is known, which is obtained by separately obtaining extract solutions from dark roasted coffee beans and light roasted coffee beans and combining them. In general, the packaged coffee beverage, since it is appropriately controlled to have desired taste or flavor by adding an auxiliary material such as a pH regulator upon a production thereof, is not much influenced by the taste or flavor derived from a raw-material. In the meantime, a concentrated coffee composition, since it is ingested by diluting it with hot water, water or milk or the like, is found to be directly influenced by the taste and aroma intrinsic to a coffee extract solution as a raw material. The present inventors found a problem in that, upon producing a concentrated coffee composition, it is insufficient just by simply combining extract solutions from dark roasted coffee beans and light roasted coffee beans to attain rich body and bitterness, which are important as the taste or flavor of coffee, as is in a packaged coffee beverage described in the above background of the Invention; and in that coarseness remaining in the mouth after coffee is ingested becomes stronger.

Accordingly, the present invention is to provide a concentrated coffee composition with good taste or flavor containing chlorogenic acids at a high concentration, and a method for producing the same.

The present inventors conducted studies on taste or flavor of a concentrated coffee composition containing chlorogenic acids at a high concentration. As a result, they found that there is a limit on improving the taste or flavor by merely using a coffee extract solution, which is obtained simply by appropriately combining at least two types of roasted coffee beans different in roast degree (L value). The present inventors further conducted studies in more detail and found that the taste or flavor of coffee is improved by controlling the content of a predetermined component in a concentrated coffee composition to be a predetermined value or less. Furthermore, they found that if such a concentrated coffee composition is used, the aroma intrinsic to roasted coffee beans is enhanced to obtain a coffee product having satisfactory rich body and bitterness while suppressing coarseness remaining in the mouth after coffee is ingested. Moreover, they found that such a concentrated coffee composition can be efficiently produced by combining two types of roasted coffee beans each having an L value within a specific range, as essential components, controlling the L value of the roasted coffee beans mixture so as to fall within a specific range, and then concentrating the mixture by multi-stage extraction.

According to the present invention, it is possible to provide a concentrated coffee composition containing chlorogenic acids at a high concentration and having good taste or flavor. Furthermore, according to the present invention, it is possible to easily and simply produce such a high-preference concentrated coffee composition.

(Concentrated Coffee Composition)

The concentrated coffee composition of the present invention has a dry solids content of 10 to 100 mass %; in view of handling, the dry solids content is preferably 20 to 99.9 mass %, more preferably 25 to 99 mass %, and even more preferably 30 to 98 mass %. In the specification, the "concentrated coffee composition" is one, which is obtained by concentrating or drying a coffee extract solution obtained from roasted coffee beans and has a higher solid content concentration than a coffee beverage generally ingested. The "concentrated coffee composition" used in the specification includes instant coffee and does not include roasted coffee beans. Furthermore, the measurement conditions of "dry solids content" in the specification follow "measurement of dry solids content" in Examples to be described subsequently herein.

Furthermore, the concentrated coffee composition of the present invention contains chlorogenic acids (A) in an amount of 100 to 300 mg/g in the dry solids content of the concentrated coffee composition. In view of taste or flavor as well as stability and physiological effect, the content is preferably 102 to 250 mg/g, more preferably 105 to 200 mg/g and even more preferably 108 to 180 mg/g. The "chlorogenic acids" herein is a general term, which collectively refers to ($A^1$) monocaffeoylquinic acids such as 3-caffeoylquinic acid, 4-caffeoylquinic acid and 5-caffeoylquinic acid; ($A^2$) monoferuloylquinic acids such as 3-feruloylquinic acid, 4-feruloylquinic acid and 5-feruloylquinic acid; and ($A^3$) dicaffeoylquinic acids such as 3,4-dicaffeoylquinic acid, 3,5-dicaffeoylquinic acid and 4,5-dicaffeoylquinic acid. The content of chlorogenic acids is defined as the total amount of the above 9 types. The measurement conditions of "content of chlorogenic acids" follow "measurement of chlorogenic acids" in Examples to be described subsequently herein.

Furthermore, in the concentrated coffee composition of the present invention, a mass ratio $[(A^3)/(A)]$ of dicaffeoylquinic acids ($A^3$) to chlorogenic acids (A) in the dry solid content of the concentrated coffee composition is preferably 0.05 to 0.16, more preferably 0.06 to 0.14 and even more preferably 0.07 to 0.13, in view of easy control of balance between stability and taste or flavor.

Furthermore, the concentrated coffee composition of the present invention contains 5-hydroxymethylfurfural (B). The 5-hydroxymethylfurfural (B) is a component produced by roasting coffee beans and is not contained in green coffee beans. The present inventors found that 5-hydroxymethylfurfural (B) is involved in coarseness remaining in the mouth after coffee is ingested. The present invention is characterized by reducing the content of 5-hydroxymethylfurfural (B) in the concentrated coffee composition from that usually present in a coffee extract solution. More specifically, the content of 5-hydroxymethylfurfural (B) is not more than 0.33 mg/g of the dry solids content of the concentrated coffee composition; in view of taste or flavor, the content is preferably not more than 0.3 mg/g, more preferably not more than 0.27 mg/g and even more preferably not more than 0.2 mg/g. The lower limit of the content is, in view of production efficiency, preferably 0.001 mg/g, more preferably 0.005 mg/g and even more preferably 0.01 mg/g. The measurement conditions of "content of 5-hydroxymethylfurfural" follow those described in a later section, "measurement of 5-hydroxymethylfurfural" of Examples.

Furthermore, the concentrated coffee composition of the present invention contains 2-methylpyrazine (C) rich in flavor produced by roasting coffee beans, and 3-methylbutanal (D), which is causal substance of reducing the aroma. In the concentrated coffee composition of the present invention, it is preferred that a content ratio of 2-methylpyrazine (C) relative to 3-methylbutanal (D) is higher in view of enhancing favorable aroma of the concentrated coffee composition.

The content ratio of component (C) to the component (D) may be determined by peak area ratio [(D)/(C)] of 3-methylbutanal (D) to 2-methylpyrazine (C), as measured by gas chromatographic/mass spectrometric analysis (GC/MS analysis) of the concentrated coffee composition. The area ratio is preferably 0.1 or less, more preferably 0.080 or less and even more preferably 0.070 or less. In the meantime, the lower limit is, in view of production efficiency, preferably 0.0001, more preferably 0.0005 and even more preferably 0.0010. The measurement conditions of "ratio [(D)/(C)]" follow "measurement of 2-methylpyrazine and 3-methylbutanal" in Examples to be described subsequently herein.

To the concentrated coffee composition of the present invention, if desired, additives such as a bitterness suppressant, an antioxidant, a flavor, an ester, an organic acid, an organic acid salt, an inorganic acid, an inorganic acid salt, an inorganic salt, a pigment, an emulsifier, a preservative, a seasoning, an acidulant, a quality stabilizer, a pH regulator, vegetable fat or oil, a protein, caramel, finely ground coffee bean powder and a cocoa powder may be added singly or in combination of two or more types.

The concentrated coffee composition of the present invention may take any form appropriately selected from e.g., a liquid form, a powder form, a granular form and a tablet form. The concentrated coffee composition of the present invention may be ingested as it is or, if necessary, after reconstituted, for example, by diluting it with water.

For example, in the case where the concentrated coffee composition of the present invention is a liquid, it may be produced into a portion-type dilution beverage. In the meantime, in the case where the concentrated coffee composition of the present invention is powder, it is suitable for producing instant coffee, and its form is a one requiring measurement by a spoon, a package suitable for brewing/infusing and a stick-like package containing a one-cup dose. Furthermore, in the case where the concentrated coffee composition of the present invention is a liquid, the composition may be also processed into instant coffee by freeze drying or spray drying.

Furthermore, the concentrated coffee composition of the present invention may be provided by packaging it not only in a retort pack using polypropylene (PP), polyethylene terephthalate (PET) or an aluminum deposited film or the like as a material but also in a container such as a metal can, a PET bottle or a glass container. In this case, it is preferable to use a sealed container filled with an inert gas such as nitrogen gas, in view of keeping quality of a product.

Furthermore, it can be produced, for example, by filling the composition in a package like a metal can and after that, when heat sterilization is feasible, conducting the heat sterilization under sterilization conditions prescribed in relevant regulations (in Japan, the Food Sanitation Act). For those which cannot be subjected to retort sterilization like PET bottles or paper packages, a process may be adopted such that the composition is sterilized beforehand at a high temperature for a short time under similar sterilization conditions as those described above, for example, by a plate-type heat exchanger or the like, is cooled to a particular temperature, and is then filled in a package.

(Packaged Coffee Beverage)

The packaged coffee beverage of the present invention may be prepared by charging a container with the concentrated coffee composition of the present invention as it is or after being diluted as needed.

The packaged coffee beverage of the present invention may be a packaged black coffee beverage or a packaged milk coffee beverage. In the case where the packaged milk coffee beverage is prepared, a milk component such as fresh milk, milk, whole milk powder, powdered skim milk, fresh cream, concentrated milk, nonfat milk, partial nonfat milk and condensed milk may be added and further the additives mentioned above may be added.

The packaged coffee beverage of the present invention may be provided by charging a package container as mentioned above with the beverage and subjecting it to heat sterilization.

(Method for Producing a Concentrated Coffee Composition)

The concentrated coffee composition of the present invention may be produced by the following method.

In the production method of the present invention, first roasted coffee beans and second roasted coffee beans, each having a roast degree (L value) controlled within a predetermined range, are firstly selected.

As first roasted coffee beans, roasted coffee beans (dark roasted beans) having an L value of 14 to 20 are used; in view of taste or flavor, the L value is preferably 15 to 19 and more preferably 16 to 18. Furthermore, as second roasted coffee beans, roasted coffee beans (light roasted beans) having an L value of 25 to 40 are used; in view of taste or flavor, the L value is preferably 25.5 to 39 and more preferably 26 to 38. The measurement method of the L value follows "measurement of L value" in Examples to be described subsequently herein. First and second roasted coffee beans may be used each independently or in combination with two or more types.

Next, first roasted coffee beans and second roasted coffee beans are mixed such that the average L value of the resultant mixture of the roasted coffee beans falls within a predetermined range. The average L value of the resultant mixture of roasted coffee beans is 21 to 28.5; in view of taste or flavor, the average L value is preferably 21.5 to 28 and more preferably 22 to 27. The "average L value" may be determined as a total of values obtained by multiplying the L value of roasted coffee beans to be used by the mass ratio of the roasted coffee beans.

In the present invention, if the average L value of the mixture of roasted coffee beans falls within the above range, third roasted coffee beans may be used other than first and second roasted coffee beans. As third roasted coffee beans, for example, coffee beans having a roast degree such as light, cinnamon, medium, high, City, full City, French and Italian may be appropriately selected. Furthermore, the mixing ratio of third roasted coffee beans may be appropriately selected as long as the average L value of the resultant mixture falls within the range of 21 to 28.5.

As a roasting method, a known method such as a direct heating system, a hot-air system and a half hot-air system may be appropriately selected. These roasting systems using a rotation drum are preferable. The roasting temperature is not particularly limited; it is preferably 100 to 300° C. and more preferably 150 to 250° C. After roasting, roasted beans are, in view of taste or flavor, preferably cooled within one hour after roasting, to 0 to 100° C. and more preferably to 10 to 60° C.

Examples of the type of coffee beans to be used in the present invention include *Coffea Arabica* and *Coffea Robusta* or the like. Examples of a production region of coffee beans include Brazil, Colombia, Guatemala, Tanzania, Ethiopia, Jamaica, Indonesia, India and Vietnam or the like. Of them, in view of bitterness and rich body intrinsic to coffee, *Coffea Robusta* is preferable.

Furthermore, in the present invention, different types of coffee beans having the same L value may be blended.

As roasted coffee beans, ground ones may be used. Examples of grinding degree include extra-fine grind (0.250 to 0.500 mm), fine grind (0.300 to 0.650 mm), medium-fine grind (0.530 to 1.000 mm), medium grind (0.650 to 1.500 mm), medium-coarse grind, coarse grind (0.850 to 2.100 mm) and extra-coarse grind (1.000 to 2.500 mm). Alternatively, cut beans having an average particle size of approximately 3 mm, 5 mm or 10 mm may be used.

Next, the mixture of roasted coffee beans, which contains first and second roasted coffee beans and having an average L value of 21 to 28.5, is subjected to multi-stage extraction. The "multi-stage extraction" is an extraction method using a system in which a plurality of extraction towers independent of each other are connected by pipes in series. Each of the extraction towers is charged with the mixture of roasted coffee beans. The extract solution discharged from a first-stage extraction tower is used as an extraction solvent in a next extraction tower and this operation is sequentially performed from tower to tower to obtain an extract solution. In the multi-stage extraction, an extraction solvent may be supplied upwardly from below to above or downwardly from above to below; in view of taste or flavor, the upward flow in which a continuous phase consists of liquid is preferably employed rather than the downward flow in which a continuous phase consists of a liquid/gas mixture. In this case, the extraction solvent is supplied in a closed system. Likewise, the multi-stage extraction is a completely different extraction method from drip extraction in which an extraction solvent is supplied downwardly from above in an open system.

In the multi-stage extraction, the extract solution of a former stage is repeatedly used in the following extraction process. Therefore, the coffee extract solution obtained by the multi-stage extraction differs from the coffee extract solutions obtained by drip extraction and a stirring system, in composition of 5-hydroxymethylfurfural or the like, even if coffee extraction solutions are prepared in the same concentration. As a result, the concentrated coffee composition obtained by the production method of the present invention differs in taste or flavor from the concentrated coffee composition using a coffee extract solution obtained by e.g., drip extraction. More specifically, owing to the production method of the present invention, it is possible to obtain a concentrated coffee composition enhanced aroma intrinsic to roasted coffee beans and having satisfactory rich body and bitterness while suppressing coarseness remaining in the mouth after coffee is ingested.

In the multi-stage extraction, a known method may be employed. For example, the following method is exemplified. The mixture of roasted coffee beans is charged in each of a plurality of extraction towers independent of each other. An extraction solvent is supplied to a first-stage extraction tower and a coffee extract solution is allowed to discharge from the extraction tower. Then, the coffee extract solution discharged from the first-stage extraction tower is supplied to a second-extraction tower and a coffee extract solution is allowed to discharge from the extraction tower. If the system has a third-stage extraction tower and subsequent towers, an operation for supplying the coffee extract solution discharged from a previous extraction tower to the next-stage extraction tower to discharge a coffee extract solution from the tower is repeatedly performed. Then, the coffee extract solution discharged from the final-stage extraction tower is collected. The phrase "extraction towers independent of each other" does not mean that the extraction towers are completely blocked from each other and means that although transfer of roasted coffee beans is restricted, the extraction towers each have connecting means capable of feeding an extraction solvent or a coffee extract in the course of production, to the next-stage extraction tower. Furthermore, the coffee extract solution discharged from an extraction tower may be not only passed through all extraction towers in a continuous manner but also temporarily stored in a tank etc. and then the stored coffee extract solution may be supplied to the next-stage extraction tower. The number of extraction towers to be used for extraction is not particularly limited as long as it is 2 or more, and may be appropriately selected so as to obtain desired taste or flavor.

As the extraction solvent, water or an aqueous solution containing an alcohol such as ethanol or the like is exemplified. Of them, in view of taste or flavor, water is preferable. The pH (25° C.) of the extraction solvent is, in view of taste or flavor, preferably 4 to 10, and more preferably 5 to 7.

The temperature of the extraction solvent is, in view of taste or flavor, preferably lower than the temperature (170 to 180° C.) usually employed in multi-stage extraction. More specifically, the upper limit is preferably 150° C., more preferably 135° C., more preferably 120° C. and even more preferably 100° C. In the meantime, the lower limit is preferably 50° C., more preferably 60° C., more preferably 70° C. and even more preferably 80° C.

The extraction pressure (gauge pressure) is, in view of taste or flavor and extraction efficiency, preferably 0.1 to 1.5 MPa, more preferably 0.2 to 1.3 MPa and even more preferably 0.4 to 1 MPa.

The extraction rate is preferably 0.5 to 2, more preferably 0.6 to 1.8 and even more preferably 0.7 to 1.6. The "extraction rate" used herein refers to a mass ratio of the extract solution obtained by extraction relative to the roasted coffee beans used in extraction and is expressed by [(mass of extract solution)/(mass of roasted coffee beans)].

The retention time of an extract solution per stage varies depending upon the extraction scale etc., and is preferably 10 minutes to 3 hours and more preferably 15 minutes to 2 hours.

Next, the coffee extract solution obtained is concentrated. The concentration operation may be performed in accordance with a known method and by use of a known apparatus, and is not particularly limited. For example, concentration under reduced pressure and concentration by a reverse osmosis membrane are exemplified. Furthermore, if powder form is desired, spray drying and freeze drying etc. may be employed to become a powdery form.

The present invention includes the following [1-1] to [2-9].

[1-1] A concentrated coffee composition containing the following components (A) and (B):

100 to 300 mg/g of chlorogenic acids (A) in dry solids content; and not more than 0.33 mg/g of 5-hydroxymethylfurfural (B) in dry solids content, wherein the dry solids content is 10 to 100 mass %.

[1-2] The concentrated coffee composition according to [1-1] above, wherein the dry solids content of the concentrated coffee composition is preferably 20 to 99.9 mass %, more preferably 25 to 99 mass % and even more preferably 30 to 98 mass %.

[1-3] The concentrated coffee composition according to [1-1] or [1-2] above, wherein the content of chlorogenic acids (A) is preferably 102 to 250 mg/g, more preferably 105 to 200 mg/g and even more 108 to 180 mg/g in dry solids content of the concentrated coffee composition.

[1-4] The concentrated coffee composition according to any one of [1-1] to [1-3] above, wherein the content of 5-hydroxymethylfurfural is preferably 0.001 to 0.3 mg/g, more preferably 0.005 to 0.27 mg/g and even more preferably 0.01 to 0.2 mg/g in dry solids content of the concentrated coffee composition.

[1-5] The concentrated coffee composition according to any one of [1-1] to [1-4] above, wherein the content mass ratio $[(A^3)/(A)]$ of dicaffeoylquinic acids $(A^3)$ to chlorogenic acids (A) contained in the dry solids content of the concentrated coffee composition is preferably 0.05 to 0.16, more preferably 0.06 to 0.14 and even more preferably 0.07 to 0.13.

[1-6] The concentrated coffee composition according to any one of [1-1] to [1-5] above, wherein the peak area ratio [(D)/(C)] of 3-methylbutanal (D) to 2-methylpyrazine (C) is preferably 0.0001 to 0.1, more preferably 0.0005 to 0.080, even more preferably 0.0010 to 0.070, as measured by gas chromatographic/mass spectrometric analysis (GC/MS analysis) of the concentrated coffee composition.

[2-1] A method for producing a concentrated coffee composition by concentrating a mixture of roasted coffee beans, which contains first roasted coffee beans having an L value of 14 to 20 and second roasted coffee beans having an L value of 25 to 40 and has an average L value of 21 to 28.5, by multi-stage extraction.

[2-2] The method for producing a concentrated coffee composition according to [2-1] above, wherein the L value of first roasted coffee beans is preferably 15 to 19 and more preferably 16 to 18.

[2-3] The method for producing a concentrated coffee composition according to [2-1] or [2-2] above, wherein the L value of second roasted coffee beans is preferably 25.5 to 39 and more preferably 26 to 38.

[2-4] The method for producing a concentrated coffee composition according to any one of [2-1] to [2-3] above, wherein the average L value of the mixture of roasted coffee beans is preferably 21.5 to 28 and more preferably 22 to 27.

[2-5] The method for producing a concentrated coffee composition according to any one of [2-1] to [2-4] above, wherein the temperature of an extraction solvent in the multi-stage extraction is preferably 50 to 150° C., more preferably 60 to 135° C., more preferably 70 to 120° C. and even more preferably 80 to 100° C.

[2-6] The method for producing a concentrated coffee composition according to any one of [2-1] to [2-5] above, wherein the extraction rate in the multi-stage extraction is preferably 0.5 to 2, more preferably 0.6 to 1.8, and even more preferably 0.7 to 1.6.

[2-7] The method for producing a concentrated coffee composition according to any one of [2-1] to [2-6] above, wherein, in the multi-stage extraction, the retention time of an extract solution per stage is preferably 10 minutes to 3 hours and more preferably 15 minutes to 2 hours.

[2-8] The method for producing a concentrated coffee composition according to any one of [2-1] to [2-7] above, wherein the extraction solvent in the multi-stage extraction is water or an aqueous solution of alcohol.

[2-9] The method for producing a concentrated coffee composition according to any one of [2-1] to [2-8] above, wherein the extraction pressure in the multi-stage extraction is preferably 0.1 to 1.5 MPa, more preferably 0.2 to 1.3 MPa and even more preferably 0.4 to 1 MPa.

EXAMPLES

Measurement of Chlorogenic Acids

Measurement method of chlorogenic acids is as follows. HPLC was used as an analyzer.

The model numbers of component units in the analyzer are as follows:

UV-VIS detector: L-2420 (Hitachi High-Technologies Corporation),

Column oven: L-2300 (Hitachi High-Technologies Corporation),

Pump: L-2130 (Hitachi High-Technologies Corporation),

Auto sampler: L-2200 (Hitachi High-Technologies Corporation),

Column: Cadenza CD-C18, 4.6 mm (inner diameter)×150 mm (length), particle size: 3 μm (Imtakt Corp.).

Analytical conditions are as follows.

Sample injection volume: 10 μL,

Flow rate: 1.0 mL/min,

Predetermined wavelength of UV-VIS detector: 325 nm,

Predetermined temperature of column oven: 35° C.,

Eluent A: 5 (v/v) % acetonitrile solution containing 0.05 M acetic acid, 0.1 mM 1-hydroxyethane-1,1-diphosphonic acid and 10 mM sodium acetate, Eluent B: Acetonitrile.

Concentration Gradient Conditions

| Time | Eluent A | Eluent B |
|---|---|---|
| 0.0 min. | 100% | 0% |
| 10.0 min. | 100% | 0% |
| 15.0 min. | 95% | 5% |
| 20.0 min. | 95% | 5% |
| 22.0 min. | 92% | 8% |
| 50.0 min. | 92% | 8% |
| 52.0 min. | 10% | 90% |
| 60.0 min. | 10% | 90% |
| 60.1 min. | 100% | 0% |
| 70.0 min. | 100% | 0% |

In HPLC, a sample (1 g) was weighed. To this, eluent A was added up to 10 mL. The resultant mixture was filtrated by a membrane filter (GL CHROMATODISK 25A, pore size 0.45 μm, GL Sciences Inc.) and then subjected to analysis.

Retention time of nine types of chlorogenic acids (unit: minute)

($A^1$) monocaffeoylquinic acids: 3 peaks at 5.3, 8.8, 11.6

($A^2$) monoferuloylquinic acids: 3 peaks at 13.0, 19.9, 21.0

($A^3$) dicaffeoylquinic acids: 3 peaks at 36.6, 37.4, 44.2.

From the area values of the nine types of chlorogenic acids as obtained herein, mass % was determined with 5-caffeoylquinic acid used as a standard substance.

(Measurement of L Value)

A sample was measured by a color difference meter (SPECTROPHOTOMETER SE2000, manufactured by Nippon Denshoku Industries Co., Ltd.).

(Measurement of Dry Solids Content)

The dry solids content refers to the mass ratio of a dried product obtained through freeze drying of a concentrated coffee composition and the concentrated coffee composition, and is defined by the expression: (mass of freeze dried product/mass of concentrated coffee composition)×100. A concentrated coffee composition (about 20 g) was weighed in a glass container for exclusive use. The concentrated coffee composition was frozen while rotating this container in an ethanol bath at −80° C. After frozen, the composition was subjected to freeze drying in a freeze dryer (FD-81, manufactured by Tokyo Rikakikai Co., Ltd.). The freeze-drying was performed in the conditions: a pressure of 0.08 Torr, and thereafter, the sample was allowed to stand still at room temperature for 20 hours.

Measurement of 5-hydroxymethylfurfural

Extracted coffee solids by freeze drying of concentrated coffee compositions obtained from Examples and Comparative Examples described later were used for analysis of 5-hydroxymethylfurfural in accordance with the method shown below. The freeze dryer used herein was Type FD-81 (manufactured by Tokyo Rikakikai Co., Ltd.).

A sample (1 g) was accurately weighed and placed in a measuring flask. Pure water was added to the flask to fix the volume to 20 mL. To solid phase column (Bond Elut SCX connected with Bond Elut SAX), which was previously washed with pure water (5 mL), the solution (6 mL) in which the sample was previously dissolved to fix the volume was provided. After initial outflow (4 mL) from the column was discarded, an eluant was obtained. The eluant (1 mL) was placed in a measuring flask (10 mL) and pure water was added to fix the volume to 10 mL. The solution thus prepared was measured for the content of 5-hydroxymethylfurfural by HPLC. At this time, 5-hydroxymethylfurfural (manufactured by Tokyo Kasei Kogyo Co., Ltd.) was used as a standard substance to obtain the mass % of 5-hydroxymethylfurfural in the coffee dry solids content from the peak area value at a retention time of 10.3 minutes.

The model numbers of component units in the HPLC apparatus are as follows:

Model name: LC-10AS (manufactured by Shimadzu Corporation)

UV-VIS detector: SPD-10AV (manufactured by Shimadzu Corporation),

Column: CAPCELL PAK C18, 4.6 mm (inner diameter)×250 mm (length), particle size: 3 μm (Shiseido Co., Ltd.).

Analysis conditions are as follows.

Sample injection volume: 10 μL,

Flow rate: 0.7 mL/min,

Predetermined wavelength of UV-VIS detector: 285 nm,

Predetermined temperature of column oven: 35° C.,

Eluent: Mixed solution of water and methanol (5:1).

Measurement of 2-methylpyrazine and 3-methylbutanal

Extracted coffee solids by freeze drying of concentrated coffee compositions obtained from Examples and Comparative Examples described later were used for analysis of 2-methylpyrazine and 3-methylbutanal in accordance with the method below.

Preparation of Analysis Sample

A sample (1 g) was accurately weighed and dissolved with ion exchange water, and its volume was increased to 50 g. The solution (1 mL) in which the sample was dissolved was weighted in a vial container (20 mL) with a screw top containing 0.5 g of NaCl. The contents of 3-methylbutanal and 2-methylpyrazine in the solution thus prepared were analyzed by GC/MS.

GC Conditions

Model name: GCMS-QP2010 (manufactured by Shimadzu Corporation)

Column to be used: DB-1 (manufactured by Agilent J&W) 60 m (length)×0.25 mm (inner diameter), film thickness: 0.25 μm Solid-phase micro extraction (SPME)-capable auto injector: AOC-5000 (manufactured by Shimadzu Corporation)

SPME fiber: DVB/Carboxen™/Polidimethylsiloxane (Supelco, Sigma-Aldrich), temperature raising conditions; 40° C. (4 min. hold)–6° C./min.–60° C.–3° C./min.–280° C. (20 min. hold)

MS Conditions

MS: scan mode: m/z 40 to 400, EI: 70 eV,

SPME: equilibration conditions: 40° C., 25 min./adsorption conditions: 40° C., 35 min.

Based on peaks in a mass spectrum obtained by the GC/MS measurement and retention time thereof, the peak at a retention time of 10.9 minutes was identified as 3-methylbutanal and the peak at a retention time of 16.9 minutes was identified as 2-methylpyrazine. Using area values of 3-methylbutanal as m/z: 44, an area value of 2-methylpyrazine as m/z: 94, an area ratio of 3-methylbutanal to 2-methylpyrazine was determined.

(Sensory Evaluation)

Instant coffees obtained in Examples and Comparative Examples described later each were diluted with ion exchange water heated to 85° C. so as to contain a dry solids content of 1.4 mass %, and were evaluated by 5 expert panels based on the following criteria and thereafter discussion was made to determine the final score, which was determined as an evaluation value.

(I) Criteria of Aroma

5: Aroma of coffee is strong
4: Aroma of coffee is slightly strong
3: Aroma of coffee is neither strong nor weak.
2: Aroma of coffee is slightly weak
1: Aroma of coffee is weak (II) Criteria of Rich Body 5: Rich taste of coffee is strong
4: Rich taste of coffee is slightly strong
3: Rich taste of coffee is neither strong nor weak.
2: Rich taste of coffee is slightly weak
1: Rich taste of coffee is weak (III) Criteria of Bitterness 5: Bitterness intrinsic to coffee is strong
4: Bitterness intrinsic to coffee is slightly strong
3: Bitterness is neither strong nor weak.
2: Bitterness intrinsic to coffee is slightly weak
1: Bitterness intrinsic to coffee is weak (IV) Criteria of Coarseness Remaining in the Mouth After Coffee is Ingested 5: Coarseness remaining in the mouth after coffee is ingested is not sensed
4: Coarseness remaining in the mouth after coffee is ingested is virtually not sensed
3: Coarseness remaining in the mouth after coffee is ingested is neither strong nor weak
2: Coarseness remaining in the mouth after coffee is ingested is slightly strong
1: Coarseness remaining in the mouth after coffee is ingested is strong (V) Criteria of Foreign Taste Like Green Coffee Beans 5: Foreign taste like green coffee beans is not sensed
4: Foreign taste like green coffee beans is virtually not sensed
3: Foreign taste like green coffee beans is neither strong nor weak.
2: Foreign taste like green coffee beans is slightly strong
1: Foreign taste like green coffee beans is strong

Examples 1 to 10, and Comparative Examples 1 and 2

Roasted coffee beans belonging to the types shown in Table 1 and having the L value shown in Table 1 were mixed in accordance with the mass ratios shown in Table 1. Five cylindrical extraction towers (160 mm (inner diameter)×660 mm (height)) were each charged with 4.2 kg of the roasted coffee bean mixture. Subsequently, hot water of 95° C. was fed to a first-stage extraction tower upwardly from the lower portion. The coffee extract solution discharged from the top portion of the first-stage extraction tower was fed to a second-stage extraction tower upwardly from the lower portion. This operation was repeatedly performed to a third-stage extraction tower and subsequent towers. The coffee extract solution discharged from the top portion of a fifth-stage extraction tower was rapidly cooled and collected. Subsequently, the resultant coffee extract solution was concentrated under reduced pressure while heating at 50° C., 30 torr by a rotary evaporator (Type N-1100V, manufactured by Tokyo Rikakikai Co., Ltd.) to obtain a concentrated coffee composition having a dry solids content of 30 mass %. Furthermore, the concentrated coffee composition obtained was powderized by a spray dryer (Pulvis GB22, manufactured by Yamato Scientific Co., Ltd.,) in the conditions: an inlet temperature of 170° C. and outlet temperature of 102° C., to obtain instant coffee.

Analysis of the concentrated coffee composition and sensory evaluation of the instant coffee were performed. The results are shown in Table 1.

Comparative Examples 3 to 5

Roasted coffee beans belonging to the types shown in Table 1 and having the L value shown in Table 1 were mixed in accordance with mass ratios shown in Table 1 so as to be 400 g. The mixture was charged to a cylindrical column extractor (76 mm (inner diameter)×680 mm (height)). Subsequently, hot water (95° C.) was fed from the lower portion of the extractor at a flow rate of 100 mL/min for 2 minutes and 29 seconds. Next, hot water (95° C.) was showered from the top portion of the extractor at a flow rate of 100 mL/min for 10 minutes and 12 seconds. Then, the showering was terminated and the mixture was allowed to stand still for 10 minutes. Ten minutes later, hot water of 95° C. was showered at a flow rate of 100 mL/min from the top portion of the extractor and at the same time a coffee extract solution was withdrawn from the lower portion of the extractor at a flow rate of 100 mL/min and rapidly cooled. The resultant coffee extract solution was concentrated in the same method as in Example 1 to obtain a concentrated coffee composition having a dry solids content of 30 mass %. Furthermore, the resultant concentrated coffee composition was powderized in the same method as in Example 1 to obtain instant coffee.

Analysis of the concentrated coffee composition and sensory evaluation of the instant coffee were performed. The results are shown in Table 1.

TABLE 1

| | Types of beans (production region) | L value | Example 1 | 2 | 3 | 4 | 5 | 6 | 7 | 8 |
|---|---|---|---|---|---|---|---|---|---|---|
| Mixing ratio of roasted coffee beans (mass %) | *Coffea Arabica* | 16.5 | 40 | | 65 | 60 | 40 | 30 | 25 | 65 |
| | (Brazil) | 24 | | | | | | | | |
| | | 35 | 60 | | | | | | | |
| | *Coffea Robusta* | 16.5 | | 40 | | | | | | |
| | (Vietnam) | 30 | | | | 40 | 60 | 70 | 75 | |
| | | 35 | | 60 | 35 | | | | | 35 |
| Average L value of roasted coffee bean mixture | | | 27.6 | 27.6 | 23.0 | 21.9 | 24.6 | 26.0 | 26.6 | 23.0 |
| Extraction condition | Extraction method | | Multi-stage extraction | Multi-stage extraction | Multi-stage extraction | Multi-stage extraction | Multi-stage extraction | Multi-stage extraction | Multi-stage extraction | Multi-stage extraction |
| | Temperature [° C.] | | 95 | 95 | 95 | 95 | 95 | 95 | 95 | 65 |
| | Pressure [MPa, gauge pressure] | | 0.3 | 0.3 | 0.3 | 0.3 | 0.3 | 0.3 | 0.3 | 0.3 |
| Analysis results of concentrated coffee composition | Dry solids content [mass %] | | 30 | 30 | 30 | 30 | 30 | 30 | 30 | 30 |
| | Chlorogenic acids in dry solids content [mg/g] | | 118.3 | 158.7 | 111.7 | 109.9 | 146.6 | 164.9 | 174.1 | 106.3 |
| | Amount of 5-hydroxymethylfurfural in dry solids content [mg/g] | | 0.26 | 0.16 | 0.10 | 0.17 | 0.25 | 0.29 | 0.31 | 0.21 |
| | Dicaffeoylquinic acids/Chlorogenic acids [mass ratio] | | 0.07 | 0.13 | 0.12 | 0.11 | 0.12 | 0.12 | 0.12 | 0.10 |
| | 3-Methylbutanal/2-methylpyrazine [GCMS area ratio] | | 0.067 | 0.054 | 0.035 | 0.057 | 0.062 | 0.083 | 0.073 | 0.030 |
| Sensory evaluation | (I) Aroma of instant coffee | | 4 | 5 | 5 | 4 | 4 | 3 | 3 | 5 |
| | (II) Rich body of instant coffee | | 4 | 5 | 5 | 5 | 4 | 4 | 3 | 4 |
| | (III) Bitterness of instant coffee | | 4 | 4 | 5 | 5 | 4 | 3 | 3 | 4 |
| | (IV) Coarseness remaining in the mouth after instant coffee is ingested | | 4 | 5 | 5 | 5 | 4 | 4 | 4 | 4 |
| | (V) Foreign taste of instant coffee like green coffee beans | | 5 | 3 | 4 | 4 | 4 | 3 | 3 | 4 |

| | Types of beans (production region) | L value | Example 9 | Example 10 | Comparative Example 1 | 2 | 3 | 4 | 5 |
|---|---|---|---|---|---|---|---|---|---|
| Mixing ratio of roasted coffee beans (mass %) | *Coffea Arabica* | 16.5 | 65 | 65 | | 10 | 40 | 60 | 40 |
| | (Brazil) | 24 | | | 100 | | | | |
| | | 35 | | | | | 60 | | |
| | *Coffea Robusta* | 16.5 | | | | | | | |
| | (Vietnam) | 30 | | | | 90 | | 40 | 60 |
| | | 35 | 35 | 35 | | | | | |
| Average L value of roasted coffee bean mixture | | | 23.0 | 23.0 | 24.0 | 28.7 | 27.6 | 21.9 | 24.6 |
| Extraction condition | Extraction method | | Multi-stage extraction | Multi-stage extraction | Multi-stage extraction | Multi-stage extraction | Drip extraction | Drip extraction | Drip extraction |
| | Temperature [° C.] | | 85 | 150 | 95 | 95 | 95 | 95 | 95 |
| | Pressure [MPa, gauge pressure] | | 0.3 | 0.3 | 0.3 | 0.3 | — | — | — |
| Analysis results of concentrated coffee composition | Dry solids content [mass %] | | 30 | 30 | 30 | 30 | 30 | 30 | 30 |
| | Chlorogenic acids in dry solids content [mg/g] | | 109.5 | 101.3 | 109.6 | 201.6 | 142.5 | 105.5 | 142.1 |
| | Amount of 5-hydroxymethylfurfural in dry solids content [mg/g] | | 0.13 | 0.19 | 0.53 | 0.37 | 0.34 | 0.34 | 0.46 |
| | Dicaffeoylquinic acids/Chlorogenic acids [mass ratio] | | 0.11 | 0.11 | 0.06 | 0.12 | 0.10 | 0.12 | 0.12 |
| | 3-Methylbutanal/2-methylpyrazine [GCMS area ratio] | | 0.031 | 0.069 | 0.051 | 0.091 | 0.504 | 0.186 | 0.184 |
| Sensory evaluation | (I) Aroma of instant coffee | | 5 | 4 | 4 | 3 | 1 | 1 | 1 |
| | (II) Rich body of instant coffee | | 5 | 5 | 2 | 2 | 2 | 2 | 2 |
| | (III) Bitterness of instant coffee | | 5 | 5 | 2 | 2 | 2 | 3 | 2 |

TABLE 1-continued

| | | | | | | | |
|---|---|---|---|---|---|---|---|
| (IV) Coarseness remaining in the mouth after instant coffee is ingested | 5 | 4 | 2 | 4 | 3 | 1 | 2 |
| (V) Foreign taste of instant coffee like green coffee beans | 4 | 4 | 5 | 3 | 4 | 4 | 3 |

From Table 1, it has found that aroma intrinsic to roasted coffee beans is enhanced and satisfactory rich body and bitterness are maintained while suppressing coarseness remaining in the mouth after coffee is ingested by controlling the content of 5-hydroxymethylfurfural (B) in a concentrated coffee composition containing chlorogenic acids (A) at a high concentration, to be a predetermined value or less. Furthermore, it has found that such a concentrated coffee composition can be obtained by multi-stage extraction and that such a concentrated coffee composition is different in composition and taste or flavor from a concentrated coffee composition using a coffee extract solution obtained by drip extraction.

Comparative Example 6

A roasted coffee bean extract solution was obtained in the same manner as in Example 1 except that roasted coffee beans of *Coffea Arabica* (produced in Brazil) having an L value of 16.5 shown in Table 2 was used alone, and was concentrated in the same manner as in Example 1. Next, a powder of green coffee beans extract-P (Oryza Oil & Fat Chemical Co., Ltd.) as an unroasted raw material of *Coffea Robusta* beans (produced in Vietnam) was mixed such that the ratio of the powder to the solids content in the roasted concentrated coffee composition previously obtained was as that shown in Table 2, to obtain a concentrated coffee composition having a dry solids content of 30 mass %. Furthermore, the resultant concentrated coffee composition was powderized in the same manner as in Example 1 to obtain instant coffee.

Analysis of the concentrated coffee composition and sensory evaluation of the instant coffee were performed. The results are shown in Table 2.

TABLE 2

| | Types of beans (production region) | L value | Comparative Example 6 |
|---|---|---|---|
| Mixing ratio of coffee solids content [mass %] | *Coffea Arabica* (Brazil) | 16.5 | 75 |
| | *Coffea Robusta* (Vietnam) | Unroasted | 25 |
| | Average L value of roasted coffee bean mixture | | — |
| Extraction condition | Extraction method | | Multi-stage extraction |
| | Temperature [° C.] | | 95 |
| | Pressure [MPa, gauge pressure] | | 0.3 |
| Analysis results of concentrated coffee composition | Dry solids content [mass %] | | 30 |
| | Chlorogenic acids in dry solids content [mg/g] | | 124.4 |
| | Amount of 5-hydroxymethylfurfural in dry solids content [mg/g] | | 0.01 |
| | Dicaffeoylquinic acids/Chlorogenic acids [mass ratio] | | 0.16 |
| | 3-Methylbutanal/2-methylpyrazine [GCMS area ratio] | | 0.021 |
| Sensory evaluation | (I) Aroma of instant coffee | | 5 |
| | (II) Rich body of instant coffee | | 4 |
| | (III) Bitterness of instant coffee | | 5 |
| | (IV) Coarseness remaining in the mouth after instant coffee is ingested | | 5 |
| | (V) Foreign taste of instant coffee like green coffee beans | | 1 |

From Table 2, it has found that foreign taste like green coffee beans derived from a green coffee bean extract solution is sensed in instant coffee obtained by blending a roasted coffee bean extract solution and a green coffee bean extract solution, and taste or flavor of coffee are impaired.

The invention claimed is:

1. A concentrated coffee composition comprising the following components (A) and (B):

100 to 300 mg/g of chlorogenic acids (A) in dry solids content; and not more than 0.33 mg/g of 5-hydroxymethylfurfural (B) in dry solids content, wherein the dry solids content is 10 to 100 mass %.

2. The concentrated coffee composition according to claim 1, wherein a content of chlorogenic acids (A) is 105 to 200 mg/g in dry solids content of the concentrated coffee composition.

3. The concentrated coffee composition according to claim 1, wherein a content of 5-hydroxymethylfurfural is 0.005 to 0.27 mg/g in dry solids content of the concentrated coffee composition.

4. The concentrated coffee composition according to claim 1, wherein a content mass ratio $[(A^3)/(A)]$ of dicaffeoylquinic acids $(A^3)$ to chlorogenic acids (A) in dry solids content of the concentrated coffee composition is 0.05 to 0.16.

5. The concentrated coffee composition according to claim 1, wherein a peak area ratio [(D)/(C)] of 3-methylbutanal (D) to 2-methylpyrazine (C) is 0.1 or less, as measured by gas chromatographic/mass spectrometric analysis (GC/MS analysis) of the concentrated coffee composition.

6. The concentrated coffee composition according to claim 4, wherein a peak area ratio [(D)/(C)] of 3-methylbutanal (D) to 2-methylpyrazine (C) is 0.1 or less, as measured by gas chromatographic/mass spectrometric analysis (GC/MS analysis) of the concentrated coffee composition.

7. The concentrated coffee composition according to claim 1, wherein a peak area ratio [(D)/(C)] of 3-methylbutanal (D) to 2-methylpyrazine (C) is 0.0010 to 0.070, as measured by gas chromatographic/mass spectrometric analysis (GC/MS analysis) of the concentrated coffee composition.

8. A method for producing a concentrated coffee composition, comprising subjecting a mixture of roasted coffee beans, which comprises first roasted coffee beans having an L value of 14 to 20 and second roasted coffee beans having an L value of 25 to 40, and has an average L value of 21 to 28.5, to multi-stage extraction, thereby forming a coffee extract solution, and then concentrating the coffee extract solution.

9. The method for producing a concentrated coffee composition according to claim 8, wherein the L value of first roasted coffee beans is 16 to 18.

10. The method for producing a concentrated coffee composition according to claim 8, wherein a temperature of an extraction solvent in the multi-stage extraction is 50 to 150° C.

11. The method for producing a concentrated coffee composition according to claim 8, wherein the temperature of the extraction solvent in the multi-stage extraction is 70 to 120° C.

12. The method for producing a concentrated coffee composition according to claim 8, wherein an extraction rate in the multi-stage extraction is 0.5 to 2.

13. The method for producing a concentrated coffee composition according to claim 8, wherein the extraction solvent in the multi-stage extraction is water or an aqueous solution of alcohol.

14. The method for producing a concentrated coffee composition according to claim 8, wherein the extraction solvent in the multi-stage extraction is water.

15. The method for producing a concentrated coffee composition according to claim 10, wherein the extraction solvent in the multi-stage extraction is water.

16. The method for producing a concentrated coffee composition according to claim 8, wherein an extraction pressure in the multi-stage extraction is 0.1 to 1.5 MPa.

17. The method for producing a concentrated coffee composition according to claim 8, wherein the extraction pressure in the multi-stage extraction is 0.4 to 1 MPa.

18. The method for producing a concentrated coffee composition according to claim 8, wherein the L value of second roasted coffee beans is 26 to 38.

19. The method for producing a concentrated coffee composition according to claim 8, wherein the average L value of the mixture is 22 to 27.

20. The method for producing a concentrated coffee composition according to claim 8, wherein the L value of first roasted coffee beans is 16 to 18, the L value of second roasted coffee beans is 26 to 38, and the average L value of the mixture is 22 to 27.

* * * * *